(12) United States Patent
Cambonie et al.

(10) Patent No.: US 6,631,167 B1
(45) Date of Patent: Oct. 7, 2003

(54) PROCESS AND DEVICE FOR TRANSFORMING REAL DATA INTO COMPLEX SYMBOLS, IN PARTICULAR FOR THE RECEPTION OF PHASE-MODULATED AND AMPLITUDE-MODULATED CARRIERS TRANSMITTED ON A TELEPHONE LINE

(75) Inventors: Joël Cambonie, La Combe de Lancey (FR); Philippe Mejean, Grenoble (FR); Dominique Barthel, Bernin (FR); Joël Lienard, Meylan (FR)

(73) Assignee: STMicroelectronics S.A., Gentilly (FR)

( * ) Notice: Subject to any disclaimer, the term of this patent is extended or adjusted under 35 U.S.C. 154(b) by 574 days.

(21) Appl. No.: 09/593,842

(22) Filed: Jun. 14, 2000

(30) Foreign Application Priority Data

Jun. 14, 1999 (FR) .............................................. 9907495

(51) Int. Cl.[7] ............................ H04K 1/10; H04L 27/28
(52) U.S. Cl. ........................ 375/260; 708/408; 708/406
(58) Field of Search ........................ 375/260, 349; 708/404, 405, 403, 406, 408, 409

(56) References Cited

U.S. PATENT DOCUMENTS

| | | | | | |
|---|---|---|---|---|---|
| 4,768,159 | A | * | 8/1988 | Gray et al. ................ | 708/405 |
| 6,081,821 | A | * | 6/2000 | Hopkinson et al. ........ | 708/406 |
| 6,324,561 | B1 | * | 11/2001 | Cambonie .................. | 708/408 |
| 6,330,580 | B1 | * | 12/2001 | Giaume et al. ............ | 708/406 |
| 6,366,936 | B1 | * | 4/2002 | Lee et al. .................. | 708/404 |
| 6,408,319 | B1 | * | 6/2002 | Cambonie .................. | 708/406 |

FOREIGN PATENT DOCUMENTS

| EP | 0478128 | 8/1991 | ......... G06F/15/332 |
|---|---|---|---|
| EP | 0855657 | 1/1998 | ........... G06F/17/14 |

OTHER PUBLICATIONS

Bidet, et al. "A Fast Single–Chip Implementation of 8192 Complex Point FFT" IEEE Journal of Solid–State Circuits. Mar. 1998, pp. 300–305.

"A Pipelined FFT Processor for Word–Sequential Data" IEEE Transactions on Acoustics, Speech and IEEE Signal Processing, vol. 371989, pp. 1982–1985.

* cited by examiner

Primary Examiner—Phuong Phu
(74) Attorney, Agent, or Firm—Lisa K. Jorgenson; Allen, Dyer, Doppelt, Milbrath & Gilchrist, P.A.

(57) ABSTRACT

The post-processing of the transformation processing of an interleaved type is temporally nested with regards to two successive symbols, and includes storage in two separately addressable memories of identical size. The addressing of the two memories is performed successively and alternately in the natural and reverse order at the frequency with the symbol clock signal.

23 Claims, 12 Drawing Sheets

FIG.7

| k | | k* | |
|---|---|---|---|
| 0 | 0000 | 0000 | 0 |
| 1 | 0001 | 1000 | 8 |
| 2 | 0010 | 0100 | 4 |
| 3 | 0011 | 1100 | 12 |
| 4 | 0100 | 0010 | 2 |
| 5 | 0101 | 1010 | 10 |
| 6 | 0110 | 0110 | 6 |
| 7 | 0111 | 1110 | 14 |
| 8 | 1000 | 0001 | 1 |
| 9 | 1001 | 1001 | 9 |
| 10 | 1010 | 0101 | 5 |
| 11 | 1011 | 1101 | 13 |
| 12 | 1100 | 0011 | 3 |
| 13 | 1101 | 1011 | 11 |
| 14 | 1110 | 0111 | 7 |
| 15 | 1111 | 1111 | 15 |

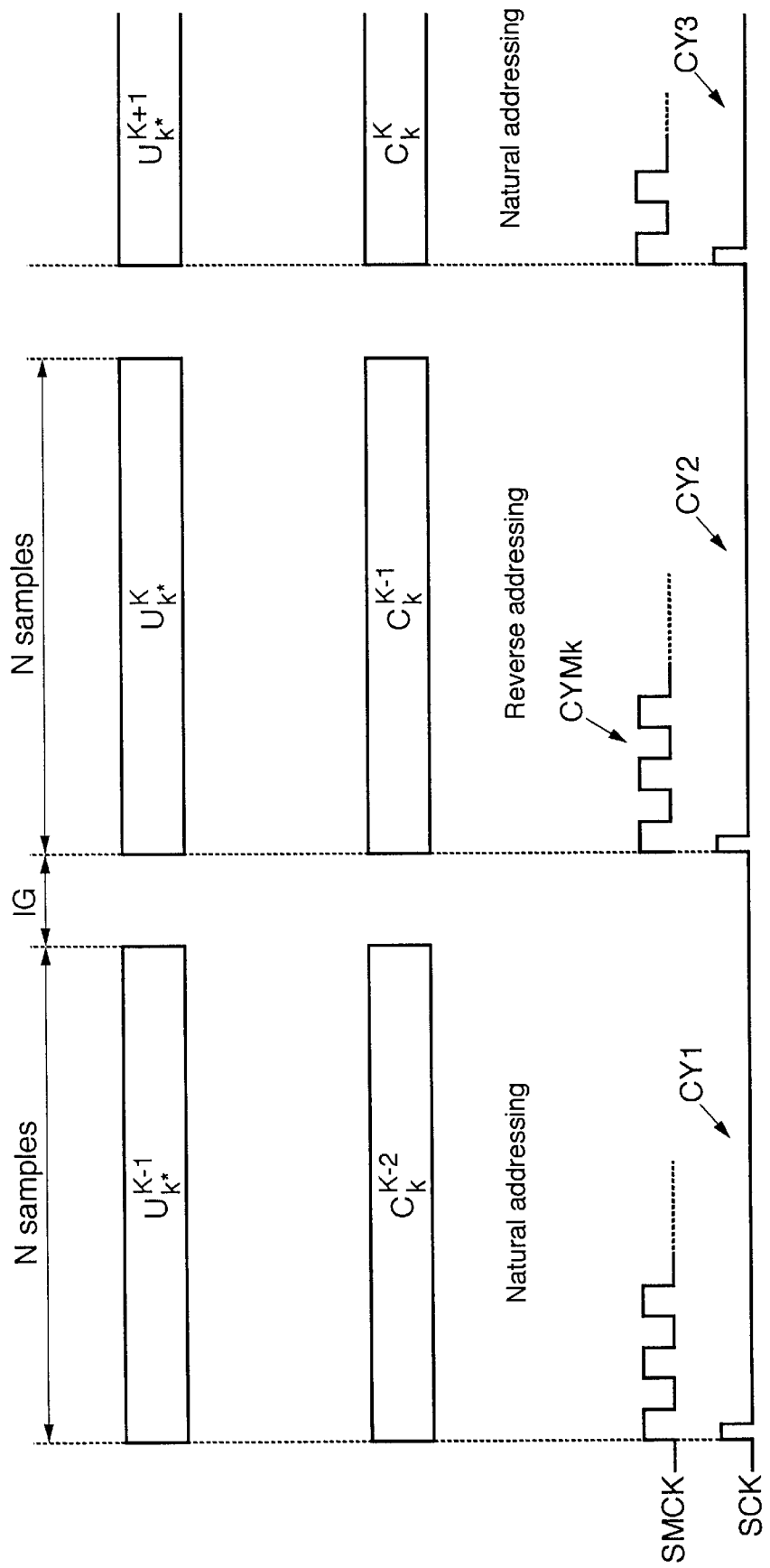

FIG.10a

| | BKM0 | BKM1 | |
|---|---|---|---|
| 0 | $U_0^0$ | $U_1^0$ | 8 |
| 1 | $U_8^0$ | $U_9^0$ | 9 |
| 2 | $U_4^0$ | $U_5^0$ | 10 |
| 3 | $U_{12}^0$ | $U_{13}^0$ | 11 |
| 4 | $U_2^0$ | $U_3^0$ | 12 |
| 5 | $U_{10}^0$ | $U_{11}^0$ | 13 |
| 6 | $U_6^0$ | $U_7^0$ | 14 |
| 7 | $U_{14}^0$ | $U_{15}^0$ | 15 |

FIG.10b

| | BKM0 | BKM1 | |
|---|---|---|---|
| 0 | $U_0^1$ | $U_8^1$ | 8 |
| 1 | $C_8^0$ | $C_9^0$ | 9 |
| 2 | $U_2^1$ | $U_{10}^1$ | 10 |
| 3 | $C_{12}^0$ | $C_{13}^0$ | 11 |
| 4 | $U_4^1$ | $U_{12}^1$ | 12 |
| 5 | $C_{10}^0$ | $C_{11}^0$ | 13 |
| 6 | $U_6^1$ | $U_{14}^1$ | 14 |
| 7 | $C_{14}^0$ | $C_{15}^0$ | 15 |

$C_7^0, C_6^0, C_5^0, C_4^0, C_3^0, C_2^0, C_1^0, C_0^0 \rightarrow$

FIG.10c

| | BKM0 | BKM1 | |
|---|---|---|---|
| 0 | $U_0^1$ | $U_8^1$ | 8 |
| 1 | $U_1^1$ | $U_9^1$ | 9 |
| 2 | $U_2^1$ | $U_{10}^1$ | 10 |
| 3 | $U_3^1$ | $U_{11}^1$ | 11 |
| 4 | $U_4^1$ | $U_{12}^1$ | 12 |
| 5 | $U_5^1$ | $U_{13}^1$ | 13 |
| 6 | $U_6^1$ | $U_{14}^1$ | 14 |
| 7 | $U_7^1$ | $U_{15}^1$ | 15 |

$C_{15}^0, C_{14}^0, C_{13}^0, C_{12}^0, C_{11}^0, C_{10}^0, C_9^0, C_8^0 \rightarrow$

FIG.10d

| | BKM0 | BKM1 | |
|---|---|---|---|
| 0 | $U_0^2$ | $C_8^1$ | 8 |
| 1 | $U_8^2$ | $C_9^1$ | 9 |
| 2 | $U_4^2$ | $C_{10}^1$ | 10 |
| 3 | $U_{12}^2$ | $C_{11}^1$ | 11 |
| 4 | $U_2^2$ | $C_{12}^1$ | 12 |
| 5 | $U_{10}^2$ | $C_{13}^1$ | 13 |
| 6 | $U_6^2$ | $C_{14}^1$ | 14 |
| 7 | $U_{14}^2$ | $C_{15}^1$ | 15 |

$C_7^1, C_6^1, C_5^1, C_4^1, C_3^1, C_2^1, C_1^1, C_0^1 \rightarrow$

PROCESS AND DEVICE FOR TRANSFORMING REAL DATA INTO COMPLEX SYMBOLS, IN PARTICULAR FOR THE RECEPTION OF PHASE-MODULATED AND AMPLITUDE-MODULATED CARRIERS TRANSMITTED ON A TELEPHONE LINE

FIELD OF THE INVENTION

The invention relates to transforming a stream of respective groups of 2N real input data into a stream of complex output symbols respectively formed of N complex output samples, by interleaved type processing. The invention applies advantageously, but not limitingly, to systems transmitting information coded according to Orthogonal Frequency Division Multiplex (OFDM) coding.

BACKGROUND OF THE INVENTION

Systems transmitting information using OFDM coding form, for example, the receiving part of a very high speed digital modulation/demodulation device (VDSL modem). In OFDM coding, the signal to be transmitted is coded on N carriers which are phase-modulated and amplitude-modulated as a function of the content of the information to be transmitted. Each carrier has a predetermined frequency and all the frequencies of the carriers are a submultiple of a predetermined sampling frequency. Also, each symbol is formed of N digital carriers, which are N complex samples sampled at the sampling frequency, and must be transformed into a group of 2N real data sampled at twice the sampling frequency. This allows the symbols to be transmitted over a transmission channel, such as a telephone line.

The transformation of a complex symbol respectively formed of N complex samples into a group of 2N real data can be performed in several ways. A first approach performs an inverse Fourier transform of twice the size, i.e., size 2N. However, this approach requires the addition of an extra processing stage as well as the addition of extra memory. A second approach performs an inverse Fourier transform of single size, i.e., size N, followed by a complex filtering. Such an implementation leads to a relatively complicated hardware embodiment.

A third approach also performs an inverse Fourier transform of size N, but is followed by a real filtering. However, this approach, which is simpler to implement than the previous approach, is approximate with regards to the accuracy obtained by reason of a signal/noise ratio which may turn out to be relatively large. A large signal/noise ratio leads to signal degradations. Also, the increase in the performance of this approach, i.e., the reduction in the signal/noise ratio, requires the use of an extremely large real filter. An extremely large real filter involves an expensive hardware implementation.

Another approach includes performing the transformation of the stream of complex symbols respectively formed of N complex samples into a stream of respective groups of 2N real data, by processing of the interleaved type. The theoretical formulation of interleaved type processing is well known to one skilled in the art.

The main characteristics of a processing of the interleaved type are recalled here for all useful purposes. The real signal x(t) corresponding to an OFDM symbol, for example, is defined by formula (I):

$$x(t) = \sum_{k=1}^{N-1} M_k \cdot \cos(2\pi f_k t + \varphi_k) \quad (I)$$

$M_m$ denotes the amplitude of the carrier of rank k, $\varphi_k$ denotes its phase, $f_k$ denotes its frequency, and N−1 is the number of carriers. When the frequencies of the carriers are all multiples of a frequency $f_1$, then formula (I) becomes formula (II) in complex notation:

$$x(t) = \mathrm{Re}\left[\sum_{k=1}^{N-1} C_k \cdot e^{2j\pi k f_1 t}\right] \quad (II)$$

in which $C_k$ denotes the complex sample representative of the carrier of rank k. $C_k$ is defined by formula (III):

$$C_k = M_k \cdot e^{j\varphi_k} \quad (III)$$

With a sampling of the signal at the frequency $Nf_1$ and by extending the length of the symbol to N carriers (by adding the carrier $C_0$ taken equal to 0), it can then be shown that the N real data of even ranks, corresponding to the N complex samples of the input symbol, are given by formula (IV):

$$\{x_{2p}\} = \mathrm{Re}\left(IFFT_N\left\{(C_k + \overline{C}_{N-k}) + j(C_k - \overline{C}_{N-k})e^{\frac{j\pi}{N}k}\right\}\right) \quad (IV)$$

The real data of odd ranks $x_{2p+1}$ are given by formula (V):

$$\{x_{2p+1}\} = \mathrm{Im}\left(IFFT_N\left\{(C_k + \overline{C}_{N-k}) + j(C_k - \overline{C}_{N-k})e^{\frac{j\pi}{N}k}\right\}\right) \quad (V)$$

In formulas (IV) and (V), $\overline{C}_{N-k}$ represents the complex conjugate of the complex number $C_{N-k}$, $IFFT_N$ represents the "inverse Fourier transform of size N" operator, Im denotes the imaginary part of a complex number, and Re denotes the real part of a complex number. It is therefore seen that the processing of the interleaved type comprises a preprocessing phase in which, for each symbol received formed of N complex samples $C_k$, a symbol formed of N complex samples $AA_k$ is formulated. Each complex sample $AA_k$ is defined by formula (VI):

$$AA_k = (\overline{C}_k + C_{N-k}) + j(C_k - \overline{C}_{N-k})e^{j\pi k/N} \quad (VI)$$

After this preprocessing, a processing phase is performed, which comprises for each symbol formed of the samples $AA_k$ an inverse Fourier transform calculation of size N. The result of this inverse Fourier transform is a set of N complex coefficients $A_k$ which, after rearrangement to retrieve the input order, makes it possible to obtain the 2N real data corresponding to the input symbol. This is because the real data of even and odd ranks correspond respectively to the real parts and imaginary parts of the complex samples $A_k$ successively obtained after rearrangement.

Once the 2N real data have been transmitted over the telephone line, they need to be recovered to perform a transformation thereof into a stream of complex symbols so as, in this instance, to obtain the complex carriers $C_k$. Here again, several approaches are conceivable. A first approach includes performing a direct Fourier transform of twice the size, i.e., size 2N. A second approach includes performing a Fourier transform of single size, i.e., size N, followed by a complex filtering. A third approach also includes performing an inverse Fourier transform of size N, but this time followed by a real filtering.

However, all these approaches have the same drawbacks as those which have been discussed above with regards to the sending part. This is the reason why one preferably performs the transformation of the stream of respective groups of 2N real input data into a stream of complex output symbols formed of N complex output samples by a processing of the interleaved type.

The main characteristics of interleaved type processing performed on reception of the real input data are recalled here for all useful purposes. As made explicit in formula (VII) below:

$$\{U_k\}_{0 \leq k \leq N-1} = FFT_N\{(X_{2p}+jx_{2p-1})_{0 \leq p < N-1}\} \quad \text{(VII)}$$

The notation $FFT_n$ denotes the direct Fourier transform operator of size N, and $U_0$ is equal to 0. The initial symbols $A_k$ with p varying from 0 to n−1, is defined by a formula (VIII):

$$A_p = x_{2p} + jx_{2p+1} \quad \text{(VIII)}$$

These symbols are formulated in a phase of initial processing.

Each initial complex sample $A_p$ has a real part formed by an input data item of even rank and an imaginary part formed by the succeeding input data item of odd rank. These N initial complex samples are ordered according to a natural order corresponding to the natural order of reception of the input data $x_p$.

The direct Fourier transform calculation of size N then makes it possible to obtain N auxiliary complex samples $U_k$ which are delivered conventionally in a so-called reverse order (bit reverse) with respect to the natural order. These auxiliary samples $U_k$ must thereafter undergo a phase of subsequent processing in accordance with formula (IX) below. This processing includes a rearrangement and a specific processing employing each auxiliary sample $U_k$ and the paired auxiliary sample $U_{N-k}$, so as to deliver again in the natural order, the N complex output samples $C_k$. Formula (IX) is as follows:

At present, a known implementation of this interleaved type processing is entirely a software implementation which turns out to be relatively complex to use in industrial apparatus, such as modems, for example. Furthermore, the larger the size of the Fourier transform and the more the processing speed increases, the more severe the implementation constraints become.

$$(C_k) = \frac{1}{4}\Big[\text{Re}(U_K) + \text{Re}(U_{N-k}) + j\,\text{Im}(U_K) - j\,\text{Im}(U_{N-K}) + e^{\frac{-j\pi}{N}K}(\text{Im}(U_K) + \text{Im}(U_{N-K}) - j\,\text{Re}(U_{N-k}) + j\,\text{Re}(U_K))\Big]$$

SUMMARY OF THE INVENTION

An object of the present invention is to reduce the software implementations as far as possible and to use, in particular for the phase of subsequent processing, hardware operators embodied in integrated circuit form and/or in the form of reprogrammable logic circuits including single-access random access memories. These components are readily available, particularly in their simplest form (e.g., as a single-access memory), and are totally independent of the technology used, and are compatible with very high operating frequencies.

Another object of the present invention is to minimize the size of the memories used for the phase of subsequent processing and to optimize the duration of latency of the phase of subsequent processing. The latency is the duration separating the arrival of the first sample of a symbol and the delivery of the first output sample. This is particularly useful for high speed transmission applications such as, for example, VDSL modems operating at 55 mbits/second.

These objects, features and advantages in accordance with the present invention are provided by a process that transforms a stream of respective groups of 2N real input data into a stream of complex output symbols respectively formed of N complex output samples. This transformation is performed by a processing of the interleaved type. This processing comprises, for a current group of input data, a phase of initial processing comprising the formulating of a current initial symbol formed of N current initial complex samples ordered according to a natural order corresponding to the natural order of reception of the input data of the current group. A direct Fourier transform calculation of size N delivers in an order said to be reverse with respect to the natural order N current auxiliary complex samples forming a current auxiliary symbol.

The processing of the interleaved type also comprises a phase of subsequent processing of the current auxiliary symbol in which the N current complex output samples, ordered according to the natural order and forming the current output symbol, are formulated on the basis of the current auxiliary samples delivered. According to a general characteristic of the invention, the phase of subsequent processing of the current auxiliary symbol comprises a first step comprising the sequential storage of the N auxiliary samples in two separately addressable random access memories of respective size equal to N/2, by using a first addressing sequence corresponding to a natural or reverse order.

The phase of subsequent processing of the current auxiliary symbol thereafter comprises a second step. This step comprises the sequential formulation of the N output samples and their sequential delivery in the natural order on the basis of a reading of these N stored auxiliary samples by using a second addressing sequence corresponding to the other of the natural or reverse orders: natural and reverse. Stated otherwise, if during the first step, the two memories have been addressed with an addressing sequence corresponding to the natural order, then the two memories will be addressed in the second step with an addressing sequence corresponding to the reverse order, and vice versa.

Moreover, the phase of subsequent processing of the current auxiliary symbol is temporally nested with the respective phases of subsequent processing of the preceding auxiliary symbol and of the next auxiliary symbol. The addressing of the two memories is performed successively and alternately according to the first and the second addressing sequences. Stated otherwise, the abovementioned temporal nesting signifies that between the end of the delivery of the preceding auxiliary symbol and the end of the delivery of the current auxiliary symbol, the first step (storage) of the phase of subsequent processing of the current auxiliary symbol and the second step (formulation and delivery) of the phase of subsequent processing of the preceding auxiliary symbol are performed.

Likewise, between the end of the delivery of the current auxiliary symbol and the end of the delivery of the next auxiliary symbol, the first step (storage) of the phase of subsequent processing of the next auxiliary symbol, and the second step (formulation and delivery) of the phase of subsequent processing of the current auxiliary symbol are performed. This nesting is regulated by a symbol-clock signal whose frequency is typically on the order of 5 kHz for N=2048. Also, the addressing of the two memories is performed alternately according to the natural order or according to the reverse order with the frequency of the symbol-clock signal.

The invention is noteworthy in that the temporal nesting of the phases of subsequent processing of the various symbols, in combination with the addressing performed alternately according to the natural order and the reverse order, and with the use of two memories (or of two memory banks) of size N/2, makes it possible, for this phase of subsequent processing, to use storage of a size equal to N. In particular, two separately addressable single-access memory banks (or memories) may be used. This would not have been possible if, as is customarily the case for software applications, the rearranging of the auxiliary samples had been performed first followed by the formulating of the output samples.

Indeed, such an implementation combined with the use of single-access memories would have required two memories of size N. One memory is for storing the auxiliary samples of the current auxiliary symbol. The other memory is for storing the auxiliary samples of the preceding symbol on the basis of which the formulating of the output samples in accordance with formula (IX) above would be performed.

According to one mode of implementation of the process, during the first step of the phase of subsequent processing of the current auxiliary symbol, each of the two paired auxiliary samples is stored in a different memory. Also, in the second step, the current output sample of rank k and the paired current output sample of rank N−k are formulated simultaneously. The current output sample of rank k is delivered directly, whereas the current output sample of rank N−k is not delivered directly. Indeed, this paired current output sample is stored in one of the memories while awaiting its re-extraction for its subsequent delivery.

The subject of the invention is also directed to a device for transforming a stream of respective groups of 2N real input data into a stream of complex output symbols respectively formed of N complex output samples. This device comprises processing means able to perform on each input group a processing of the interleaved type. These processing means comprise an initial processing block comprising formulation means able to formulate an initial symbol formed of N current initial complex samples ordered according to a natural order corresponding to the natural order of reception of the input data of the input group.

The initial processing block furthermore comprises means of direct Fourier transform calculation of size N, delivering in a so-called reverse order with respect to the natural order, N auxiliary complex samples forming an auxiliary symbol. The processing means furthermore comprises a subsequent processing block able to formulate on the basis of the auxiliary samples delivered, the N complex output samples, ordered according to the natural order, and forming the output symbol corresponding to the input group.

According to a general characteristic of the invention, the subsequent processing block comprises two separately addressable random access memories of respective size equal to N/2. This subsequent processing block furthermore comprises first processing means able to perform a first processing comprising the sequential storage of the N auxiliary samples in the two random access memories according to a first controllable addressing sequence corresponding to one of the orders natural and reverse.

The subsequent processing block also comprises second processing means able to perform a second processing comprising the reading of the N stored auxiliary samples according to a second controllable addressing sequence corresponding to the other of the orders natural and reverse; the sequential formulation of the N output samples; and their sequential delivery in the natural order.

The subsequent processing block also comprises control means able to activate the first processing means, then the second processing means so as to perform successively the first and second processing relating to each current auxiliary symbol; to activate in parallel the first processing means and the second processing means so as to perform respectively the first and second processing relating to two successive auxiliary symbols; and to alternately activate the first and the second addressing sequence with each new activation of the first processing means.

BRIEF DESCRIPTION OF THE DRAWINGS

Other advantages and characteristics of the invention will become apparent on examining the detailed description of unlimiting modes of implementation and embodiments, and the appended drawings in which:

FIG. 7 is a table illustrating the conversion of an address coded according to a natural order or according to a reverse order, and more generally illustrates the correspondence between the natural order and the reverse order;

FIG. 9 illustrates a timing diagram of a first mode of implementation of the process according to the present invention;

FIGS. 10a–10e illustrate, for a symbol comprising sixteen samples the various phases for writing to and reading from the memories of the device according to the present invention;

DETAILED DESCRIPTION OF THE PREFERRED EMBODIMENTS

Although the invention is not limited thereto, embodiments and modes of implementation of the invention which are more particularly applicable to very high speed digital modems will now be described. The invention relates, within the framework of this application, more particularly to the receiving part of these modems within which the real data received are to be transformed into complex symbols in such a way as to retrieve the characteristics of the carriers transmitted, which have been phase-modulated and amplitude-modulated.

Figure 1:
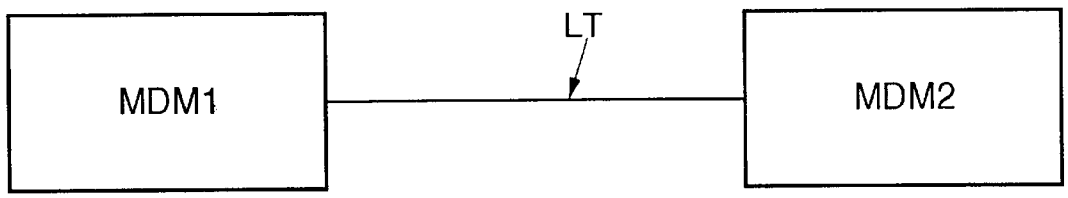
FIG. 1 is a block diagram illustrating two modems implementing the present invention.
Figure 2:
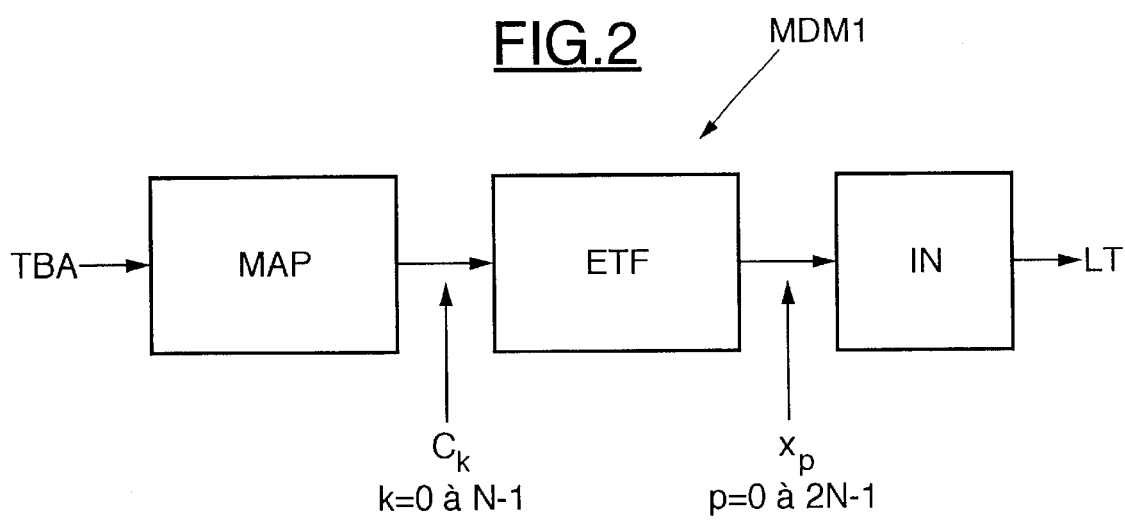
FIG. 2 is a block diagram illustrating in greater detail the internal architecture of the sending part of a modem according to the present invention.

In FIG. 1, the references MDM1 and MDM2 respectively denote two modems talking by way of a telephone line LT. Each modem comprises a sending part and a receiving part. The sending part of the modem MDM1 will be described first. As illustrated more particularly in FIG. 2, it may be seen that this sending part of the modem MDM1 comprises carrier allocation means MAP, of conventional structure, receiving an asynchronous bit train TBA and delivering a regular sequence of carriers at a predetermined frequency, such as 11 MHz, for example. Each complex carrier $C_k$ is associated with a frequency $f_k$ which is a submultiple of the sampling frequency. Typically, the intercarrier frequency space is on the order of a few kHz. N (for example, 2048) complex samples $C_k$, as defined by formula (III), form a complex symbol.

In practice, the various symbols are mutually spaced by a guard interval comprising a greater or lesser number of samples, which may be the copy of certain samples of the symbol following the guard interval. The sending of the various symbols of the stream of symbols sent by the carrier allocation means MAP are regulated by a symbol-clock signal whose frequency is typically on the order of 5 kHz for N=2048.

Each complex symbol, formed of the N complex samples $C_k$ is thereafter transformed in transformation means ETF into a group of 2N real output data $x_p$, with p varying from 0 to 2N−1. The output data $x_p$ are thereafter transmitted to an interface IN, of conventional structure, before transmission on the telephone line LT.

Within the context of the present invention, the manner in which the transformation of the samples $C_k$ into the output data $x_p$ is performed is relatively straightforward and will not be discussed in greater detail. This transformation, of course, comprises an inverse Fourier transform which can be performed in various ways. This transformation includes an inverse Fourier transform of size 2N, or an inverse Fourier transform of size N followed by a complex or real filtering, or else processing of the interleaved type.

Figure 3:
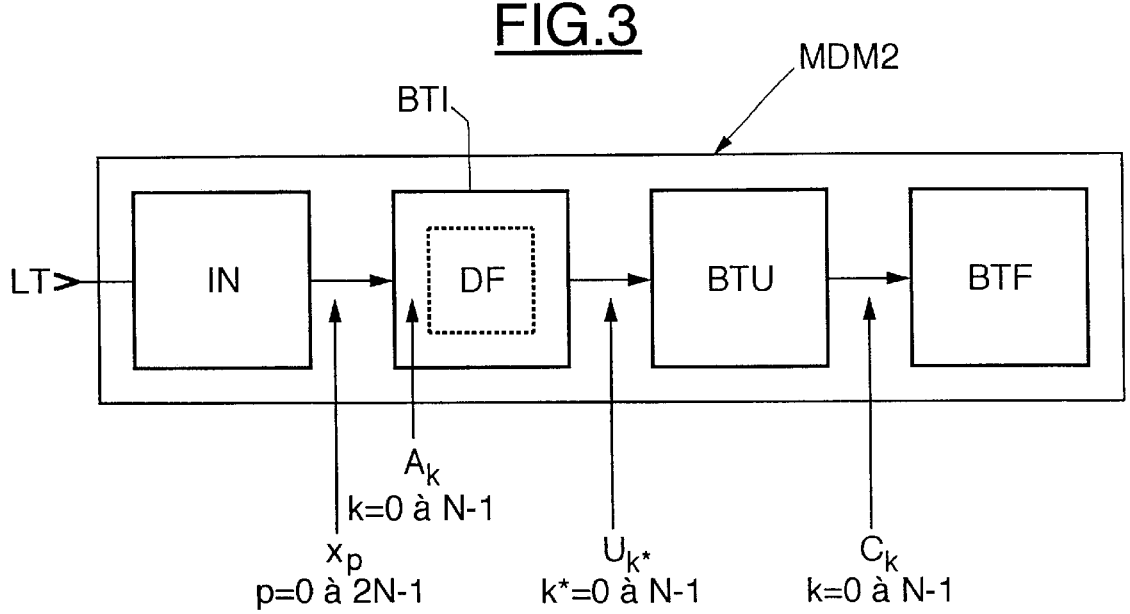
FIG. 3 is a block diagram illustrating in greater detail the receiving part of a modem according to the present invention.

Within the context of the present invention, one is now interested in the receiving part of a modem, and, more particularly, in the receiving part of the modem MDM2. As illustrated more particularly in FIG. 3, it may be seen that this receiving part of the modem MDM2 also comprises an interface IN, of conventional structure, connected to the transmission line. This permits the delivery of the stream of input data groups $x_p$ to an initial processing block BTI. This initial processing block BTI first comprises formulation means (not represented here for the sake of simplification) able to formulate for each group of data $x_p$, with p varying from 0 to 2N−1, an initial symbol A formed of N initial complex samples $A_k$, with k varying from 0 to N−1.

More precisely, in an interleaved processing, each initial complex symbol $A_k$ exhibits, in accordance with formula (VIII) a real part equal to a real data item of even rank $x_{2p}$, and an imaginary part equal to the consecutive real data item of odd rank $x_{2p+}$. Apart from these formulation means, the initial processing block BTI comprises calculation means DF able to perform a direct Fourier transform of size N on each initial symbol formed of N initial complex samples $A_k$.

The calculation means DF then delivers, for each initial symbol $A_k$ an auxiliary symbol $U_{k}$, with k* varying from 0 to N−1. However, one skilled in the art is aware that the auxiliary complex samples $U_k$ are delivered in a so-called reverse order (bit reverse) with respect to the natural order of input of the initial samples $A_k$. This is the reason why k* denotes the rank of the sample U corresponding to this reverse order. The significance of this reverse order will be returned to in greater detail below.

Here again, the way in which the direct Fourier transform of size N is performed and the structure of the calculation means DF is relatively straightforward and will riot be discussed in greater detail. There are in fact numerous direct Fourier transform setups which may be used in a general manner within the context of the present invention.

Numerous implementations of direct Fourier transforms which are dedicated or programmed on microprocessors for signal processing have been set out in the literature. Most of these implementations use a variation of the Cooley-Tukey algorithm, which is well known to one skilled in the art. This makes it possible to reduce the number of arithmetic operations required to calculate the Fourier transform. This algorithm thus makes it possible, in particular, to reduce the calculation of a fast Fourier transform of initial size $r^p$, where r represents the radix according to the terminology customarily used by one skilled in art, into that of r Fourier transforms of size $r^{p-1}$ and of additional complex additions and multiplications. By iteratively repeating this reduction, we arrive at the calculation of Fourier transforms of size r, which are easily achievable, especially if r is chosen equal to 2 or 4.

The Cooley-Tukey algorithm uses a calculation graph exhibiting a general butterfly-like structure, well known to one skilled in the art, and is commonly referred to by the term butterfly. Several hardware architectures are then possible to implement a butterfly-like calculation structure. A first approach includes constructing a hardware operator capable of performing a butterfly-type calculation, i.e., per butterfly of the graph. However, such an approach is only conceivable with respect to the implementation of small size Fourier transforms.

A second approach includes constructing just a single hardware operator of the butterfly type, which is intended for performing in succession the calculations corresponding to all the butterflies of all the stages of the graph. Such an approach requires a very fast hardware operator, or an input memory which is separate from the memory serving to write the intermediate calculation results. This is done to avoid access conflicts when a data block enters the operator while the previous block is still undergoing processing.

An intermediate approach includes constructing a hardware operator of the butterfly type per stage of the graph, as well as a storage element, such as delay lines or shift registers, for example, whose function is to input the data into the operator in the correct order with regards to the butterflies of the graph of the relevant stage. Such architectures are said to be serial or pipelined according to the usual terminology used by one skilled in the art.

More precisely, an electronic device for calculating a Fourier transform of a pipelined architecture comprises a plurality of successive processing stages connected in series between the input and the output of the device by internal data paths. These stages respectively comprise elementary processing means and elementary storage means. The elementary processing means perform Fourier transforms of elementary sizes which are smaller than the initial size on data blocks of sizes which are successively reduced from one stage to the next.

The expression "initial size" of the Fourier transform is understood to mean here and in the subsequent text the size of the blocks (symbols) received at the input of the device by the first stage. The elementary sizes of the Fourier transforms performed by the various stages can be identical and equal to the radix of the Fourier transform. One then speaks of a uniform radix Fourier transform. They may differ from one stage to another in the case of mixed radix Fourier transforms.

Examples of pipelined architectures are described in the article by Bi and Jones entitled "A Pipelined FFT Processor for Word-Sequential Data", IEEE Transactions on Acoustic Speech and Signal Processing, Vol. 37, No. 12, December 1989, pages 1982–1985, and in the article by Bide et al., entitled "A Fast Single-Chip Implementation of 8192 Complex Point FFT", IEEE Journal of Solid-State Circuits, Vol. 30, No. 3, March 1995, pages 300–305. The calculation means DF will therefore preferably comprise a pipelined architecture whose hardware embodiment can, for example, be readily effected in integrated circuit form and/or in the form of reprogrammable logic circuits by using automatic synthesis tools.

Figure 4:
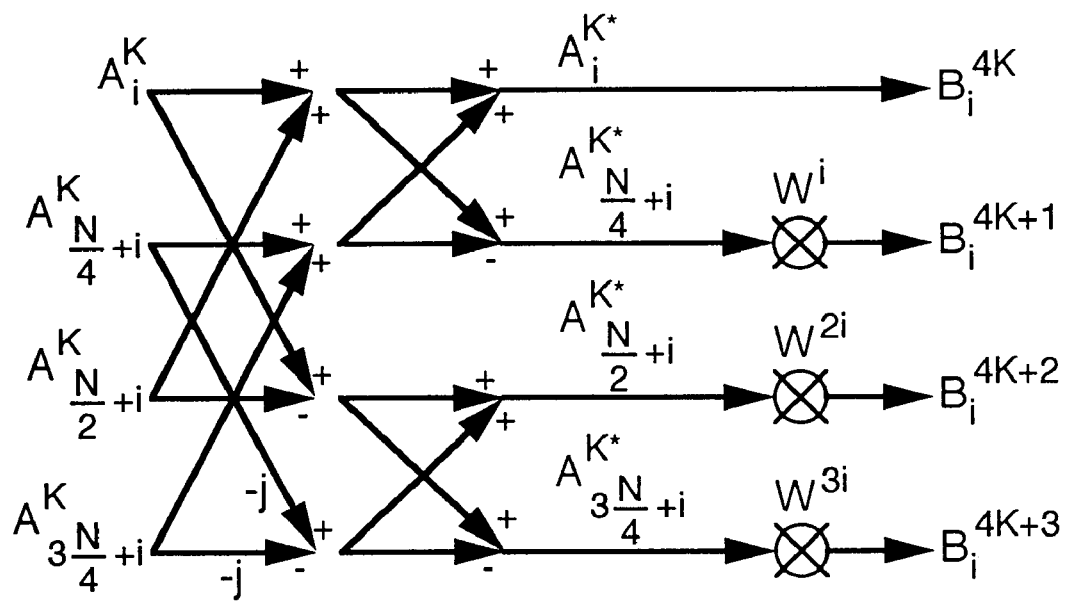
FIG. 4 illustrates a radix 4 butterfly-like direct Fourier transform operator according to the present invention.

Reference is now made more particularly to FIG. 4 which illustrates a radix 4 butterfly-like direct Fourier transform operator. In general, if for a radix 4 processing stage the size of the block of samples (or symbol) received at input is equal to N, this block of samples can be decomposed into four segments of N/4 samples, each temporally received consecutively. The first segment is formed of the samples $A_i^K$, the second segment is formed of the samples $A_{N/4+i}^K$, the third segment is formed of the samples $A_{N/2+i}^K$, and the fourth segment is formed of the samples $A_{3N/4+i}^K$, with i varying from 0 to N/4−1 and representing the number of processings of the butterfly type performed in the stage on each block of samples received. K represents the $K^{th}$ block received by the stage. The variable i is equal to k modulo 4, where k represents the rank of the data item in the block or symbol.

Moreover, one skilled in the art is aware that if s denotes the rank of the relevant stage, N is equal to $N0/4^s$, where N0 denotes the initial size of the inverse Fourier transform, i.e., the size of each symbol received by the input stage. Furthermore, if the relevant stage is the first, N is equal to N0 and the $K^{th}$ block corresponds to the $K^{th}$ symbol received. On the other hand, if the relevant stage is not the first (rank s different from 0), each symbol input to the device is decomposed recursively within each stage into $4^s$ blocks K, with K varying from 0 to $4^s-1$.

The result of these butterfly-type processings are intermediate samples which are also ordered within four intermediate segments each containing N/4 intermediate samples. More precisely, the first intermediate segment contains the intermediate samples $A_i^{K*}$, the second intermediate segment contains the intermediate samples $A_{N/4+i}^{K*}$, the third intermediate segment contains the samples $A_{N/2+i}^{K*}$, and the fourth intermediate segment contains the samples $A_{3N/4+i}^{K*}$.

These intermediate samples are obtained according to the following formulas (X) to (XIII):

$$A_i^{K*} = A_i^K + A_{K/4+i}^K + A_{N/2-i}^K + A_{3N/4+i}^K \quad (X)$$

$$A_{N/4+i}^{K*} = A_i^K - A_{N/4+i}^K + A_{N/2-i}^K - A_{3N/4+i}^K \quad (XI)$$

$$A_{N/2+i}^{K*} = A_i^K - jA_{N/4+i}^K - A_{N/2+i}^K + jA_{3N/4+i}^K \quad (XII)$$

$$A_{3N/4+i}^{K*} = A_i^K + jA_{N/4+i}^K - A_{N/2+i}^K - jA_{3/N/4+i}^K \quad (XIII)$$

In these formulas, j denotes the complex number whose square is equal to −1, and i varies from 0 to N/4−1. These intermediate samples are next multiplied by predetermined coefficients $W^0$, (which is equal to 1), $W^i$, $W^{2i}$ and $W^{3i}$ according to the relevant segments. These coefficients are conventional complex coefficients which are well known to one skilled in the art, given by the formula $w^{pi} = e^{-2j\pi pi/N}$, where p varies from 0 to 3 and i from 0 to N/4−1.

After multiplying by these coefficients W, four blocks $BB^{4K}$, $BB^{4K+1}$, $BB^{4K+2}$, $BB^{4K+3}$ respectively containing N/4 output samples $B_i^{4K}$, $B_i^{4K+1}$, $B_i^{4K+2}$ and $B_i^{4K+3}$, with i varying from 0 to N/4−1, are obtained at the output of the processing stage. All the blocks BB will then be processed consecutively by the elementary processing means of the following stage, each of these blocks is regarded as an input symbol for this following stage.

Figure 5:
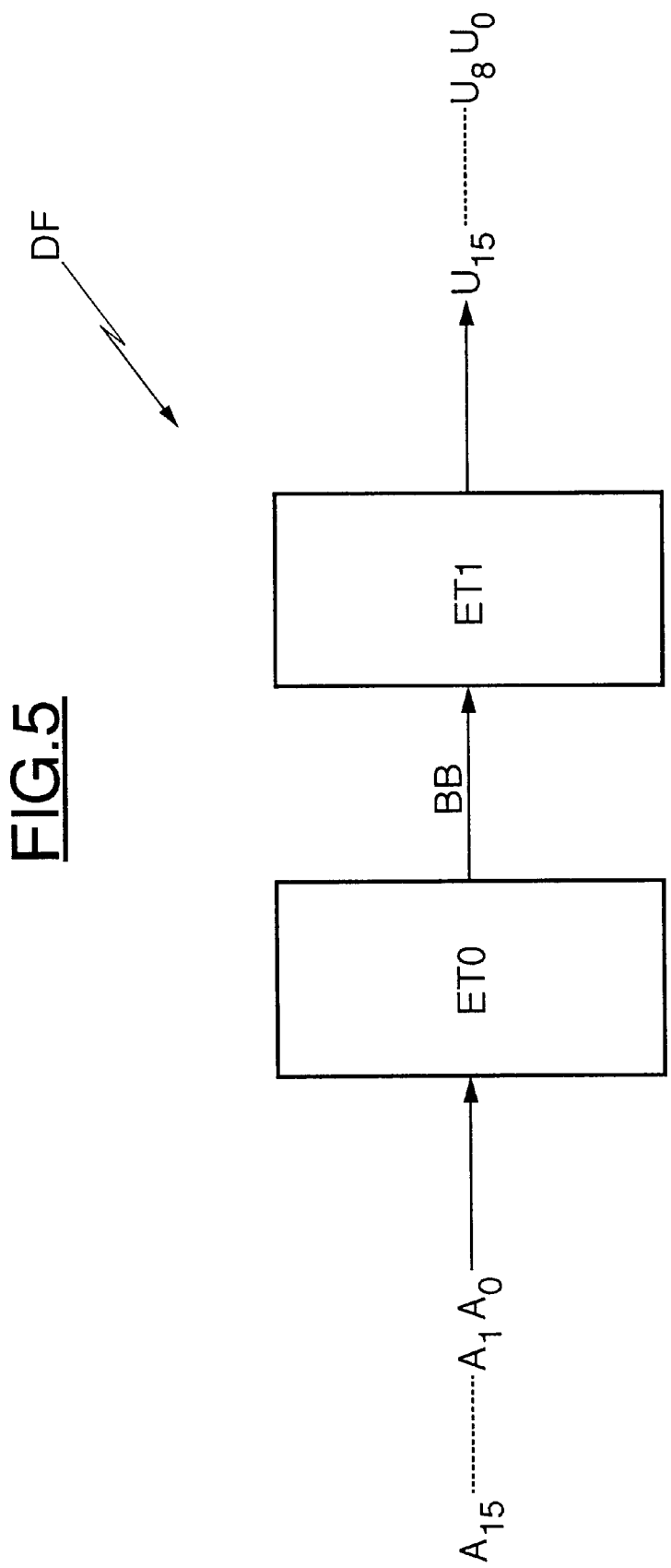
FIG. 5 is a block diagram of a direct Fourier transform setup with a pipelined architecture with two processing stages, and is incorporated into a modem according to the present invention.

In FIG. 5, the means DF here form a pipelined architecture comprising two radix 4 processing stages, referenced ET0 and ET1. These two processing stages perform elementary Fourier transform processings in accordance with the operator illustrated in FIG. 4. In this FIG. 5, it is assumed, for the purpose of simplifying discussion, that the size of the initial symbol is equal to 16, with the size of the Fourier transform therefore also being equal to 16.

The input stage ET0 receives streams of initial symbols, respectively comprising sixteen initial samples $A_0$–$A_{15}$. The output of the stage ET0 delivers successive blocks BB of four samples which are processed in the stage ET1. This stage ET1 delivers the output symbol $U_{15}$ ... $U_{80}$ corresponding to the direct Fourier transformation of the initial symbol.

Figure 6:
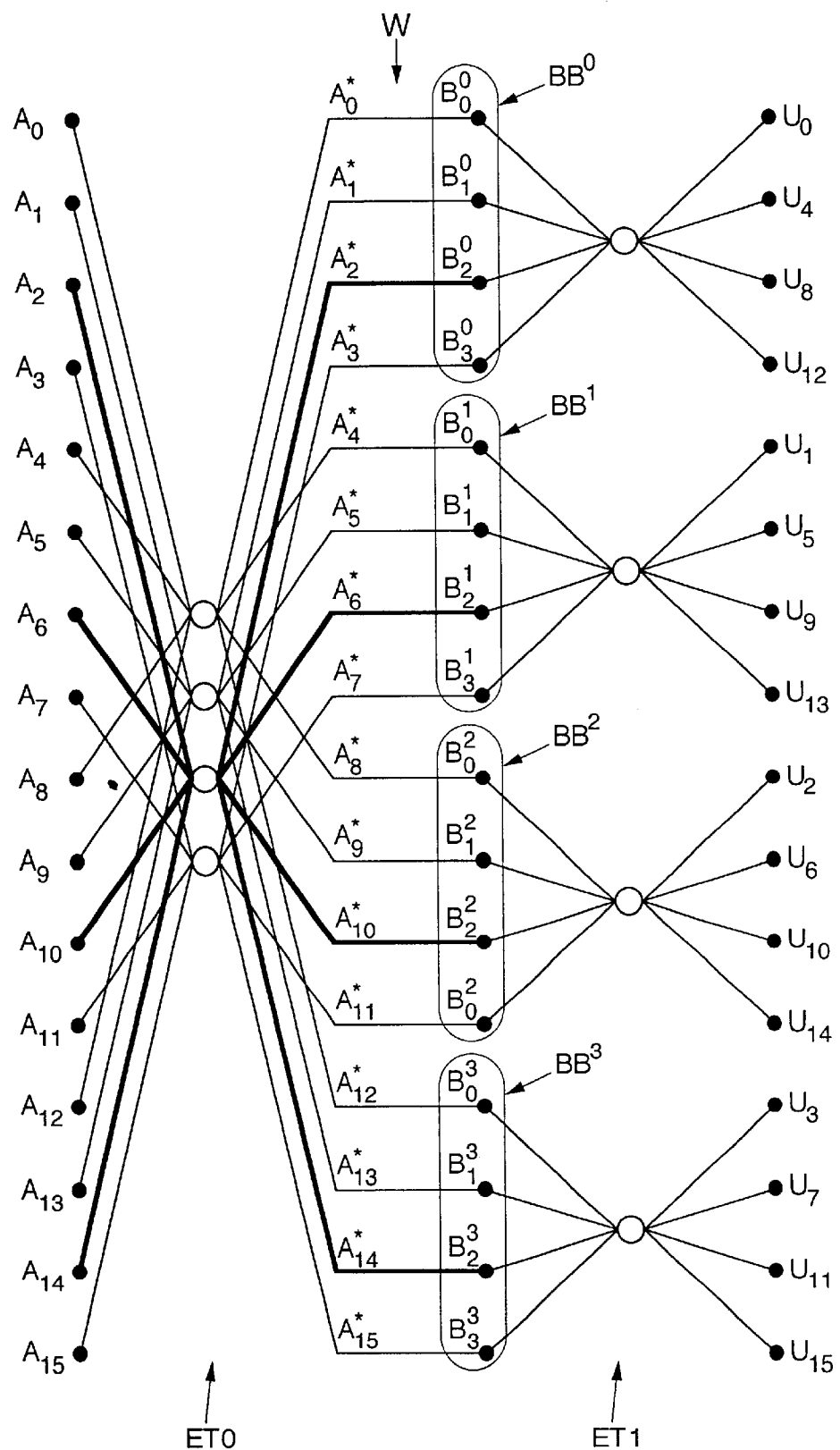
FIG. 6 illustrates butterfly-type processing performed according to the present invention.

FIG. 6 illustrates the particular case of the sixteen samples (N=16) of each block received by the stage ET0. The radix 4 processing stage then performs N/4 processings of the butterfly type in accordance with the graph of FIG. 4, on N/4 separate groups of four data items, formed respectively by a sample of the first segment and the counterpart samples of the other three segments.

In the particular example of FIG. 6, the stage ET0 performs a first butterfly-type processing on the group formed of the samples $A_0$, $A_4$, $A_8$ and $A_{12}$, a second processing of the butterfly type on a second group formed of the samples $A_1$, $A_5$, $A_9$ and $A_{13}$ and so on up to a fourth butterfly-type processing on the fourth group formed of the samples $A_3$, $A_7$, $A_{11}$ and $A_{15}$.

The elementary processing means of step ET1 will successively perform a processing of the butterfly type in accordance with the graph of FIG. 4 on the four samples of each input block BB, so as to obtain intermediate data B*. Output samples are then provided which are in fact, in the present case, the auxiliary samples $U_{k*}$, that is, the result of the direct Fourier transform.

As illustrated more particularly in FIG. 5, it may be seen that the auxiliary samples $U_{k*}$ exit in a different order from the order of input of the samples $A_k$. In fact, they exit in a reverse order or bit reverse order according to terminology which is well known to one skilled in the art. More precisely, if one refers to the graph of FIG. 4, the so-called bit reverse order delivers successively at the output of each processing stage of the system with a pipelined architecture the samples $B_i^{4K}$, $B_{4K+2}$, $B_{4K+1}$ and $B_{4K+3}$ (the blocks $BB_{4K}$, $BB^{4K+2}$, $BB^{4K+1}$, $BB_{4K+3}$) FIG. 6 complies with the graph of FIG. 4 which does not illustrate the bit reverse order.

If one refers to FIG. 7 which illustrates this natural order and this so-called reverse order in the particular case of sixteen samples (k varying from 0 to 15), it may be seen that if the initial samples $A_k$ are received successively in the order 0, 1, 2, 3, 4, 5, 6, 7, 8, 9, 10, 11, 12, 13, 14, 15, the auxiliary samples $U_k$ are delivered successively in the order k*equal to 0, 8, 4, 12, 2, 10, 6, 14, 1, 9, 5, 13, 3, 11, 7, 15.

Also illustrated in FIG. 7 is the coding of the decimal values of the values k and k* on four bits to more clearly illustrate this so-called "reverse bit" coding concept which includes effecting a symmetry of the two extreme bits and a symmetry of the two middle bits.

The N auxiliary complex samples $U_{k*}$, delivered in the reverse order k*, will then undergo a subsequent processing in a subsequent processing block BTU (FIG. 3) in accordance with formula (IX), to deliver according to the natural order the complex output samples $C_k$. The block BTU is followed by a final processing block BTF, of conventional structure, making it possible to obtain the bit train TBA.

Figure 8:
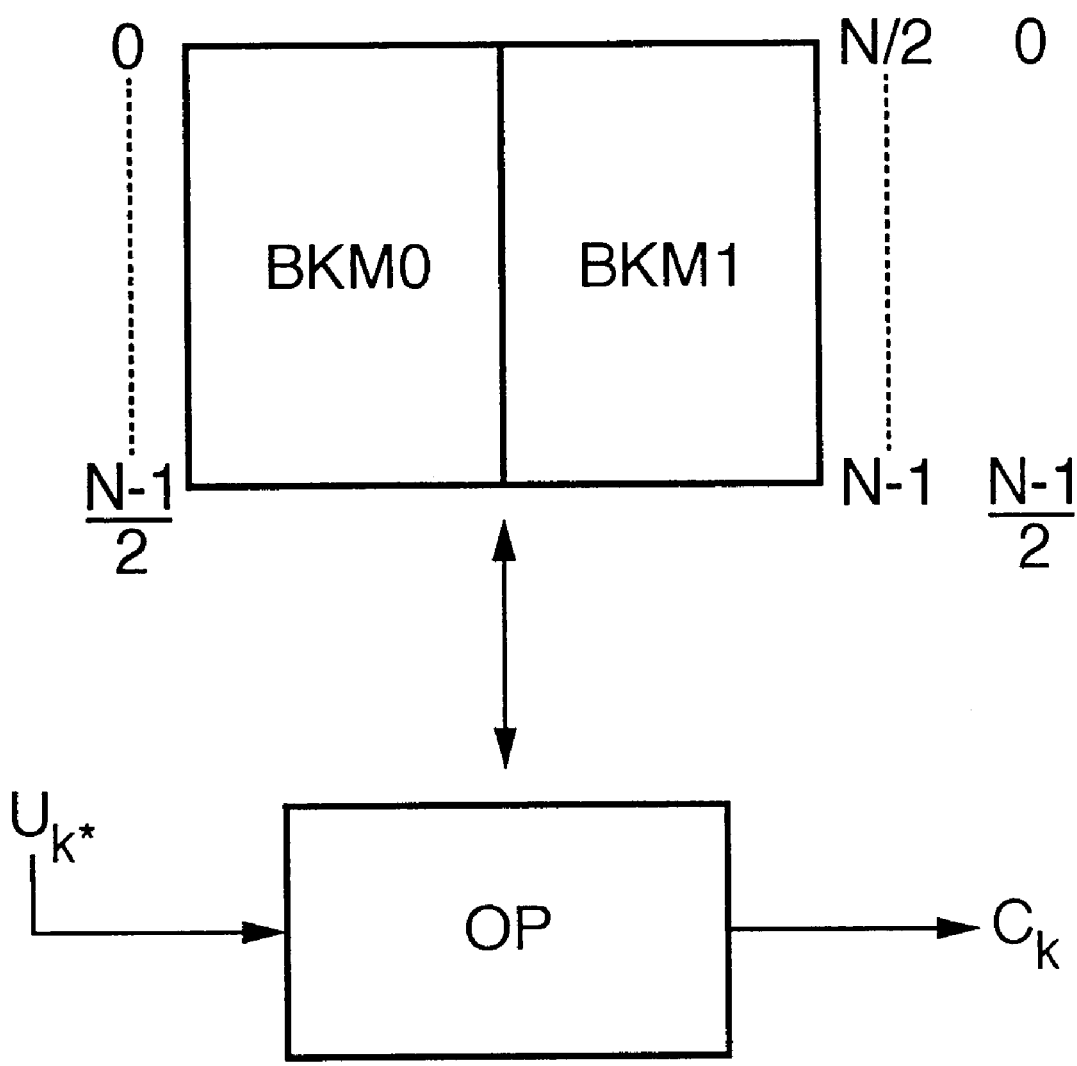
FIG. 8 is a block diagram in greater detail of the internal architecture of a subsequent processing block incorporated into a device according to the present invention.

As illustrated in FIG. 8, the subsequent processing block BTU comprises an operative part OP, receiving the various auxiliary samples $U_{k*}$, in the reverse order, and cooperating with two random access memories BKM0 and BKM1, each having a size equal to N/2, to formulate and deliver in the natural order the complex output samples $C_k$. Each memory BKM0, BKM1 can therefore store N/2 complex samples. These two random access memories are independent and separately addressable.

In one embodiment, one of the memories BKM0 is associated with the addresses 0 to (N−1)/2, while the second memory BKM1 is associated with the addresses N/2 to N−1. With this arrangement, in practice, the memories BKM0 and BKM1 may be regarded as being two independent and separately addressable memory banks. Each memory bank is indexed. More precisely, the memory bank BKM0 is assigned, for example, the index 0, while the memory bank BKM1 is assigned the index 1.

In this case, each of the memory banks is associated with the same addresses 0 to (N−1)/2, but will be distinguished through its index. It should be observed here that the addresses 0 to (N−1)/2 are equivalent to the addresses N/2 to N−1 modulo N/2. The addressing of these two memory banks will be discussed in greater detail below.

The manner of operation of this operative part OP will now be described in greater detail while referring more particularly to FIGS. 9 and 10. The real input data $x_p$ are received successively by the modem MDM2, and in particular by the initial processing block BTI, one by one, at a frequency $F_c$ equal to 22 MHz, for example. The auxiliary samples $U_k$ contained in each of the auxiliary symbols delivered by the block BTI are delivered at the frequency of a basic clock signal SMCK whose frequency is equal to half the frequency $F_c$, which in this instance is 11 MHz.

Moreover, the delivery of each auxiliary symbol U is regulated by a symbol clock signal SCK whose frequency is on the order of 5 KHz when the number of samples N is equal to 2048. Moreover, in a conventional manner, the various auxiliary symbols $U^K$ are mutually separated by a guard interval IG.

As far as the means forming the operative part OP are concerned, they are regulated by a working clock signal MCK whose frequency is a multiple of the frequency of the basic signal SMCK. More precisely, this frequency is twice as large as the frequency of the basic signal SMCK, i.e., four times as large depending on whether the operative part OP receives in the course of each cycle of the basic signal SMCK, either the real part and the imaginary part of each auxiliary sample, or only the real part or the imaginary part. The frequency of the signal MCK also depends on the passband of the memory banks or memories BKMO and BKMI. In other words, on their capacity to store for each complex sample, either the real part and the imaginary part, or only the real part or the imaginary part.

It is assumed here, for purposes of simplification, that the real part and the imaginary part of a complex auxiliary sample $U_{k*}$ are received in the course of each cycle of the signal SMCK and that the memory banks BKMO and BKMI can store this sample in full. In this case, the frequency of the working clock signal is 22 MHz. Each memory bank BKMO and BKMI, which in the present case are preferably single-access memory banks, are addressable at least once in a read mode and once in a write mode in the course of each cycle of the signal SMCK. This is done in frequency with the signal MCK. The single-access memory banks allow either write-access or read-access at each cycle of the working clock signal MCK.

Of course, if for each complex sample the memory banks BKMO and BKMI store only its real part or its imaginary part, the frequency of the working clock signal MCK is then 44 MHz and each memory bank could then be addressed twice in read mode and twice in write mode in the course of each cycle of the signal SMCK. This is done in frequency with the signal MCK.

As illustrated in the left part of FIG. 9, in the course of a cycle CY1 of the signal SCK, the N samples $U_{k*}^{K-1}$ of the auxiliary symbol of rank K−1 are delivered successively in the reverse order k* by the initial processing block BTI. Although the samples are delivered in the reverse order, they are, in the course of this cycle CY1 of the signal SCK, stored in the two memory banks in the natural order. In other words, they are stored according to a first addressing sequence complying with this natural order. More precisely, the sample $U_+$ is stored at the address k. When two indexed memory banks are used, the address k in fact signifies the address k modulo N/2 in the memory bank of index E2k/N). Here E denotes the integer part operator.

Thus, in the course of this first step of the phase of subsequent processing of the auxiliary symbol of rank K−1, each of the two paired auxiliary samples $U_k$ and $U_{N-k}$ is stored in a different memory or memory bank. It is recalled here that two samples are said to be paired when the sum of their respective ranks is equal to N. Once the auxiliary samples of the symbol K−1 have been written to the two memory banks, the second step of the phase of subsequent processing of this symbol of rank K−1 starts at the next cycle CY2 of the clock signal SCK.

This second phase will include simultaneously formulating the output sample of rank k, $C_k^{K-1}$, and the paired output sample of rank N−k. The output sample of rank k will then be delivered directly, while the paired output sample will be stored in one of the memories while awaiting its re-extraction with a view to its subsequent delivery. Moreover, in the course of this second step, the addressing of the memory banks is performed according to a second addressing sequence corresponding to the reverse order. More precisely, in the course of each cycle CYMk of the clock signal SMCK, the sample $U_k^{K-1}$ and the sample $U_{N-k}^{K-1}$ are bound with the respective addresses k* and (N−k)*.

Still in the course of this-cycle CYMk of the signal SMCK, the samples $C_k^{K-1}$ and $C_{N-k}^{K-1}$ are formulated simultaneously in accordance with formula (IX). The sample $C_k^{K-1}$ is then delivered directly without prior storage thereof in one of the memories, while one of the memories is overwritten with the sample $C_{N-k}$ at the address (N−k)*. This is at the memory bank of index E(2(N−k)*/N) at the address (N−k)* modulo N/2.

It should be noted here that the addresses corresponding to the samples $C_k^{K-1}$ are the addresses k*. Also, these addresses are in fact available since these samples are delivered directly by the operative part as output. Thus, after N/2 cycles of the signal SMCK, all the output samples $C_k^{K-1}$, with k varying from 0 to N−1, have been formulated according to formula (IX).

In the course of the succeeding N/2 cycles of the signal SMCK, the second step of this subsequent processing continues with the reading at the addresses (N−k)* (k varying from N/2 to N−1), of the samples $C_{N-k}^{K-1}$, and their delivery in the natural order. Thus, after these N/2 succeeding cycles, all the addresses of the two memory banks have been read and the output symbol $C^{K-1}$ corresponding to the auxiliary symbol $U^{K-1}$ has been formulated by the operative part and delivered sample by sample in the natural order.

In the course of this succeeding cycle CY2 of the signal SCK, the auxiliary samples $U_{k*}^K$ of the auxiliary symbol $U^K$ of rank K are also delivered by the initial processing block BTI. This is done in frequency with the clock signal SMCK. Also, in the course of the first N/2 cycles of the clock signal SMCK, the samples $U_{k*}^K$ are stored in one of the two memories at the address k*. More precisely, these samples are stored in the memory bank of index 2k*/N at the address k* modulo N/2. This is possible since, as explained above, the samples $C_k$ of the symbol of rank K−1 are delivered directly as output and are not restored in one or other of the memories.

Thereafter, in the course of the succeeding N/2 cycles of the signal SMCK, the storage of the auxiliary samples of the symbol of rank K is continued in the corresponding memory as and when the samples $C_{N-k}$ of the symbol of rank K−1 are extracted from the corresponding memory so as to be delivered in the natural order. Of course, when in the course of the preceding cycle CY1, the auxiliary symbol of rank K−1 was stored in the two memory banks, and the output samples of the symbol of rank K−2 were formulated in the manner just described. This formulation was performed by accessing memory banks according to a natural addressing. Also, the addressing of the memory banks will again be performed according to the addressing sequence corresponding to the natural order with respect to the storing of the auxiliary samples of rank K+1 and the formulating of the output samples of the symbol of rank K (Reference is directed to the right part of FIG. 9 at cycle CY3 of the signal SCK).

One skilled in the art will therefore observe that the phase of subsequent processing of the auxiliary symbol of rank K is temporally nested with the respective phases of subsequent processing of the auxiliary symbol of rank K−1 and of the auxiliary symbol of rank K+1. Moreover, the addressing of the two memories is performed successively and alternately according to the addressing sequence corresponding to the natural order and the reverse order.

More precisely, in the mode of implementation illustrated in FIG. 9, in the course of each symbol clock signal cycle SCK, the first step (storage) of the phase of subsequent processing of the current auxiliary symbol and the second step (formulation and delivery) of the phase of subsequent processing of the preceding auxiliary symbol are performed. Also, in the course of the next symbol clock cycle, the first step (storage) of the phase of subsequent processing of the next auxiliary symbol and the second step (formulation and delivery) of the phase of subsequent processing of the current auxiliary symbol are performed.

Illustrated in FIGS. 10a to 10e are the phases of subsequent processing of the symbols of rank 0 and of rank 1 (K=0 and K=1), assuming that the number of samples is equal to 16. Moreover, for the sake of simplification, the addresses have been represented to the right of the memory bank BKM1, in their notation going from 8 to 15 so as, with the aim of clarifying the explanation, to ignore the indexes of the memory banks.

In FIG. 10a, the auxiliary samples of the symbol of rank 0, which are delivered in the reverse order, k*, are described in the two memory banks at the addresses k. Here we have addressing according to the natural order. More precisely, the sample of rank 8 is stored at the address 1, while the sample of rank 13 is stored at the address 11 and the sample of rank 5 is stored at the address 10.

FIGS. 10b and 10c illustrate the reading and writing of the two memory banks (memories) in the course of the next symbol clock cycle. More precisely, FIG. 10b relates to the first eight cycles of the signal SMCK, while FIG. 10c concerns the last eight cycles of the signal SCK. In FIGS. 10b and 10c, the addressing of the two memory banks is performed according to the reverse order. More precisely, in the course of the first cycle of the signal SMCK, the sample $U_0^0$ located at the address 0 is extracted from the memory BKM0, along with the sample $U_{15}^0$ located at the address 15. The samples $C_0^0$ and $C_{15}^0$ are formulated simultaneously. The sample $C_0^0$ is delivered as output and the sample $C_{15}^0$ is stored in the memory BKM1 at the address 15. In parallel, the sample $U_0^1$ is stored at the address 0 which has been freed by reason of the extraction of the sample $U_0^0$ for the formulation of the sample $C_0^0$.

At the next clock cycle of the signal SMCK, the sample $U_1^0$ located at the address 8 and the sample $U_{14}^0$ located at the address 7 are extracted. The sample $C_1^0$ and the sample $C_{14}^0$ are formulated simultaneously. The sample $C_1^0$ is delivered as output and the sample $C_{14}^0$ is written to the memory BKM0 at the address 7. Thus, after the first eight cycles of the clock signal SMCK, the configuration illustrated in FIG. 10b is obtained, the samples $C_0^0$–$C_7^0$ having been delivered successively in the natural order as output. In the course of the succeeding eight cycles of the signal SMCK (FIG. 10c), the samples $C_8^0$–$C_{15}^0$ are extracted successively from the memories BKM0 and BKM1 in the natural order so as to be replaced successively and respectively by the samples $U_1^1$, $U_9^1$, $U_5^1$, $U_{13}^1$, $U_3^1$, $U_{11}^1$, $U_7^1$ and $U_{15}^1$.

Figure 10E:
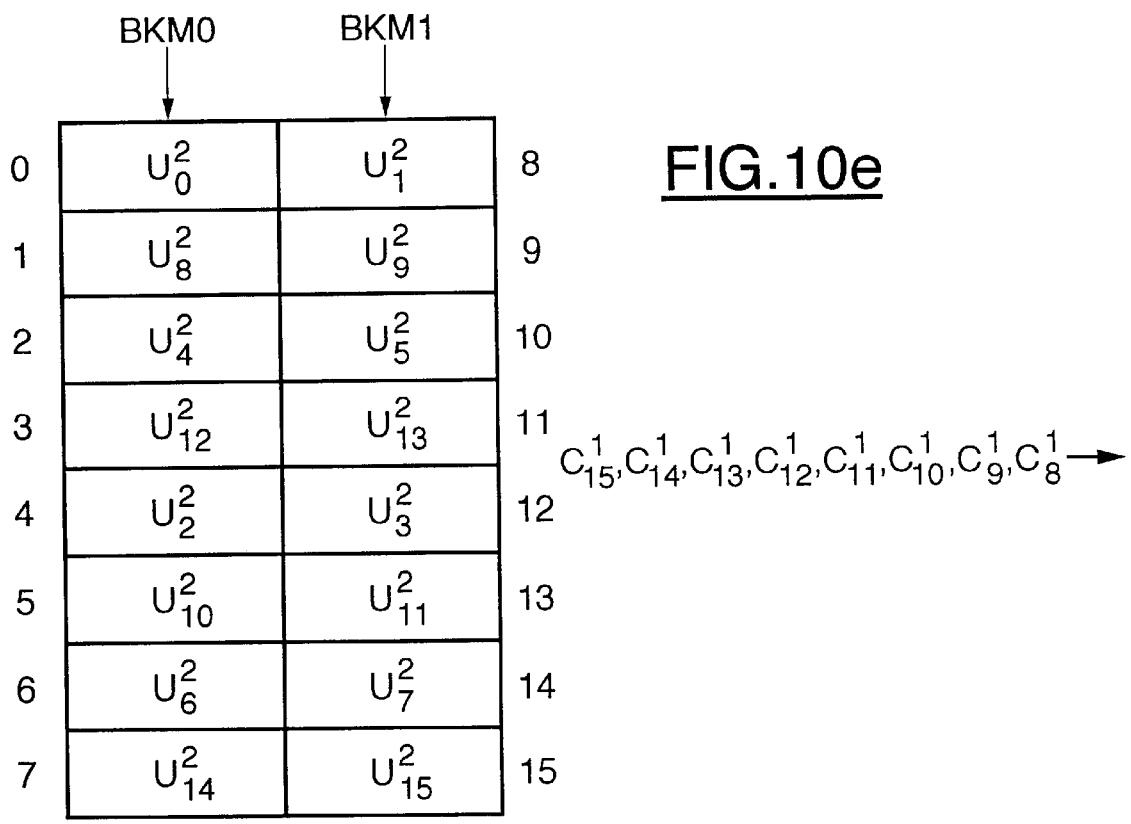

The content of the two memory banks in the course of the next symbol clock cycle is represented in FIGS. 10d and 10e. FIG. 10d is representative of the first eight cycles of the clock signal SMCK, while FIG. 10e is representative of the succeeding eight cycles. Here again, the addressing of the two memory banks is performed according to the natural order. The manner of operation just described with reference to FIGS. 10b and 10c therefore applies with respect to FIGS. 10d and 10e with the addressing in the natural order.

Thus, in the course of the first eight cycles of the signal SMCK, the first eight output samples of the symbol of rank 1 have been delivered successively in the natural order (FIG. 10d), while the first eight auxiliary samples of the symbol of rank 2 which were delivered in the reverse order have at the same time been written to the memory. In the course of the next eight cycles, one continues to deliver in the natural order the last eight output samples of the symbol of rank 1, while one terminates the filling of the memory with the other eight auxiliary samples of the symbol of rank 2.

Figure 11:
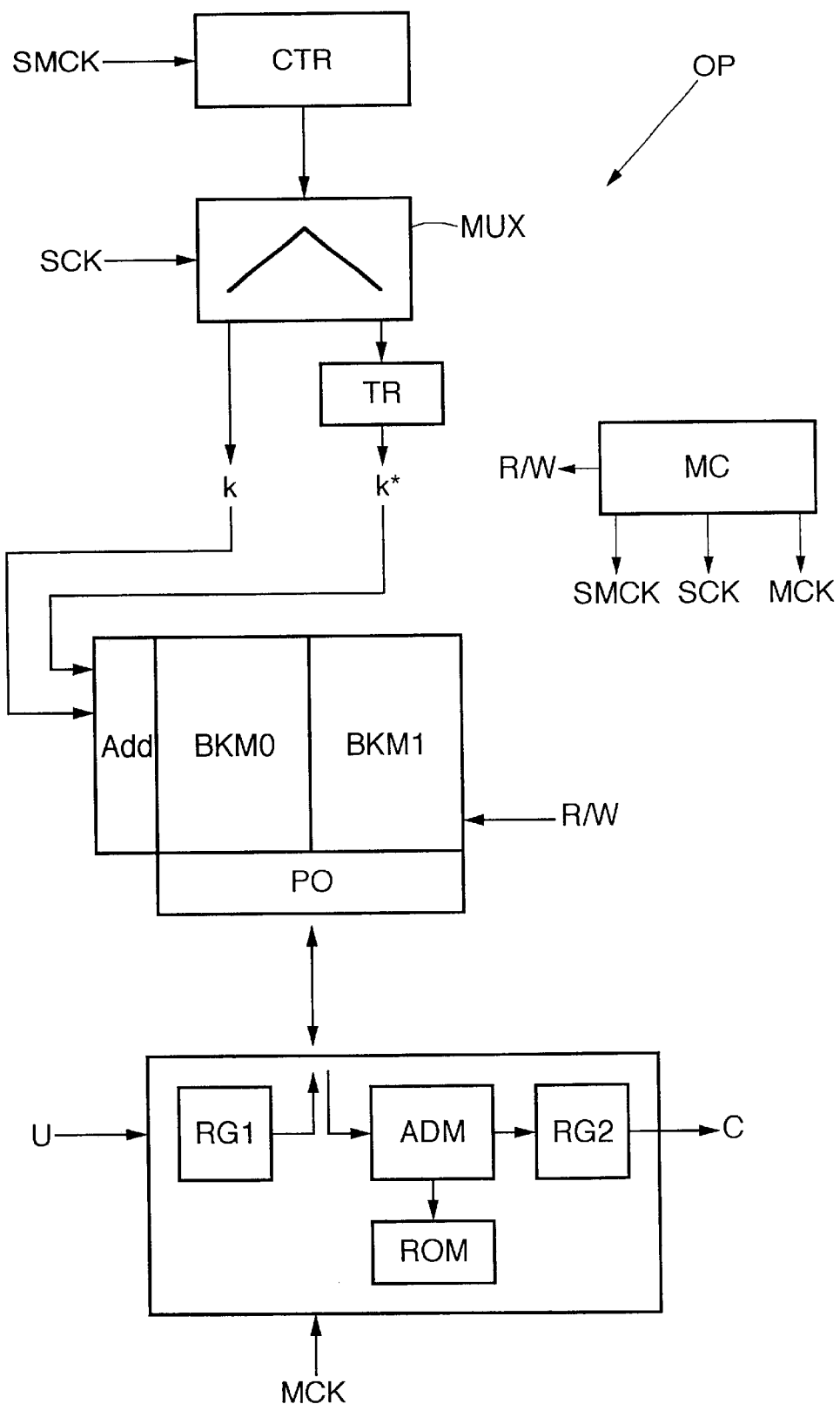
FIG. 11 is a block diagram illustrating in greater detail a part of the subsequent processing block according to the present invention.

In terms of hardware, the various elements of the subsequent processing block BTU may be embodied by using automatic synthesis tools based on the formulas above, for example, and on the functional description of implementation above. One then obtains a hardware embodiment in integrated circuit form and/or in the form of reprogrammable logic circuits. FIG. 11 illustrates a hardware architecture allowing implementation of the process according to the invention.

With regards to the means for addressing the two memory banks or memories BKM0 and BKM1, these may comprise a counter CTR counting from 0 to N−1 at the frequency of the signal SMCK. The output of this counter CTR is directly the storage address or reading address of the two memory banks in the case of natural addressing. It is assumed here, for the sake of simplification, that the addresses of the memory bank BKM0 vary from 0 to N/2−1, while the addresses of the memory bank vary from N/2 to N−1. Of course, in the case where the addresses of the two memory banks vary from 0 to (N−1)/2 with two different indexes, it is then necessary to make provisions for the conversion modulo 2 of the output of the counter CTR and for formulating the indexes based on multipliers and on dividers. Add denotes the row decoder of the two memory banks and PO denotes the input/output bridge of the samples.

In the case of reverse addressing at k*, transformation means TR are provided which make it possible to switch from the natural order k to the reverse order k*. In fact, these transformation means may be formed simply by wiring. The wiring includes a reversal of the leads corresponding to the bits of the output word which is delivered by the counter CTR and coding the index k. The switch from the natural order to the reverse order is selected by a multiplexer MUX controlled by the symbol clock signal SCK.

The first processing, performed by the operative part OP, which includes storing the auxiliary samples sequentially in the two random access memories according to one of the addresses, natural or reverse, is then performed using registers. These registers include register RG1 storing one by one the samples U received, and by write-accesses to the memories at the addresses delivered by the counter CTR.

The delivery of the various samples from the register RG1 is regulated by the working clock signal MCK delivered by a control sequencer MC of conventional structure. This sequencer also delivers the other clock signals SMCK and SCK, as well as the write or read control signal R/W for the memory.

The second processing which comprises the reading according to the natural or reverse order of the N auxiliary samples stored, as well as a sequential formulating of the output samples and their sequential delivery in the natural order, is performed. This is with regards to reading, and is likewise performed on the basis of the addresses delivered by the output of the counter CTR and by the read control signal delivered by the control sequencer MC. The formulating of the output samples is performed by hardware means ADM formed of multipliers and of adders in cooperation with a read only memory storing the sine and cosine values of the complex coefficients $e^{-j\pi k/N}$ (formula IX). Here again, these means ADM, as well as the output register RG2, are regulated by the clock signal MCK.

Figure 12:
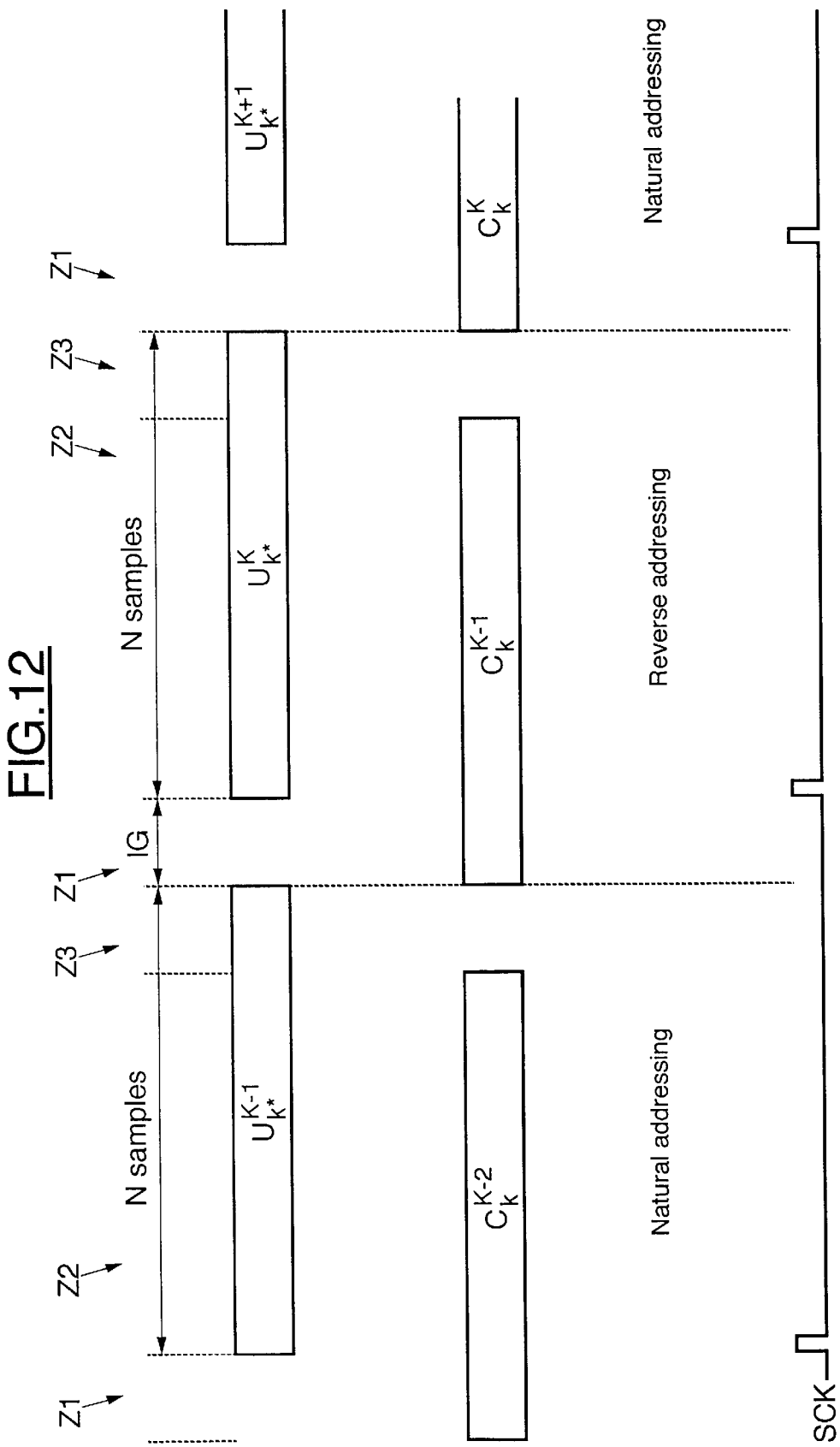
FIG. 12 represents a schematic timing diagram illustrating another implementation of the process according to the present invention.

In order to optimize, in particular, the processing speed, the mode of implementation illustrated in FIG. 12 may be used. More precisely, in this case, the duration of the guard interval (zone Z1) will be used to begin to formulate the output samples $C_k$ of the symbol of rank K−1. Then, after this guard interval (zone Z2), simultaneously the samples $C_k$ of the symbol of rank K−1 will be formulated and the auxiliary samples of the symbol of rank K will be stored. Then, in the zone Z3, the storing of the samples of rank K will be terminated.

The phase of subsequent processing of the current auxiliary symbol still remains temporally nested with the respective phases of subsequent processing of the preceding auxiliary symbol and of the succeeding auxiliary symbol. The addressing of the two memories is still performed successively and alternately according to the natural or reverse order. However, in this mode of implementation, this temporal nesting signifies that between the end of the delivery of the preceding auxiliary symbol (rank K−1) and the end of the delivery of the current auxiliary symbol ($U^K$), the first step (storage) of the phase of subsequent processing of the current auxiliary symbol and the second step (formulation and delivery) of the phase of subsequent processing of the preceding auxiliary symbol (of rank. K−1) are performed. This begins (zone Z1) with the second step of the phase of subsequent processing of the preceding auxiliary symbol and ends with the first step of the phase of subsequent processing of the current auxiliary symbol (zone Z3).

Moreover, between the end of the delivery of the current auxiliary symbol (rank K) and the end of the delivery of the succeeding auxiliary symbol (rank K+1), the first step of the phase of subsequent processing of the next auxiliary symbol and the second step of the phase of subsequent processing of the current auxiliary symbol are performed. This begins (zone Z1) with the second step of the phase of subsequent processing of the current auxiliary symbol and ends with the first step of the phase of subsequent processing of the next auxiliary symbol (zone Z3).

With regards to the hardware embodiment in accordance with this implementation, one skilled in the art will readily be able to tailor it as a function of this constraint by using, in particular, two distinct counters instead of a single counter CTR (FIG. 11) for determining the read and write addresses. One counter is for the read addresses and the other for the write addresses so as to take account of the shift in the indexes in zone Z2. Also, in this mode of implementation, these counters will generally be regulated to always write a sample to a write address of lower rank than a read address.

That which is claimed is:

1. A process for transforming a stream of respective groups of 2N real input data into a stream of complex output symbols respectively formed of N complex output samples, by a processing of the interleaved type comprising:

performing initial processing for a current input group comprising formulating a current initial symbol formed of N current initial complex samples ordered according to a natural order corresponding to reception of input data of the current input group;

performing a Fourier transform calculation of size N delivering in an order reverse with respect to the natural order, N current auxiliary complex samples forming a current auxiliary symbol;

performing subsequent processing of the current auxiliary symbol in which N current complex output samples are ordered according to the natural order, and forming a current output symbol based upon the current auxiliary samples delivered, the subsequent processing comprising sequentially storing N auxiliary samples in two separately addressable random access memories of respective size at least equal to N/2 using a first addressing sequence corresponding to a first one of the natural and reverse orders, sequentially formulating N output samples and their sequential delivery in the natural order based upon a reading of the N stored auxiliary samples using a second addressing sequence corresponding to a second one of the natural and reverse orders, the subsequent processing of the current auxiliary symbol being temporally nested with the respective subsequent processing of a preceding auxiliary symbol and of a next auxiliary symbol, and addressing of the two separately addressable random access memories being performed successively and alternately according to the first and the second addressing sequences.

2. A process according to claim 1, wherein during the sequentially storing comprises storing each of two paired auxiliary samples in a different memory; and wherein during the sequentially formulating comprises formulating simultaneously a current output sample of rank k and a paired current output sample of rank N−k.

3. A process according to claim 2, wherein the current output sample of rank k is delivered directly and the paired current output sample is stored in one of the memories while awaiting re-extraction prior to a subsequent delivery.

4. A process according to claim 1, wherein between the end of the delivery of the preceding auxiliary symbol and the end of the delivery of the current auxiliary symbol, the subsequent processing of the current auxiliary symbol and the subsequent processing of the preceding auxiliary symbol are performed beginning with the subsequent processing of the preceding auxiliary symbol and ending with the subsequent processing of the current auxiliary symbol.

5. A process according to claim 1, wherein between the end of the delivery of the current auxiliary symbol and the end of the delivery of the next auxiliary symbol, the subsequent processing of the next auxiliary symbol and the subsequent processing of the current auxiliary symbol are performed beginning with the subsequent processing of the current auxiliary symbol and ending with the subsequent processing of the next auxiliary symbol.

6. A process for transforming a stream of respective groups of 2N real input data into a stream of complex output symbols respectively formed of N complex output samples, by a processing of the interleaved type comprising:
    performing initial processing for a current input group comprising formulating a current initial symbol formed of N current initial complex samples ordered according to a natural order corresponding to reception of input data of the current input group;
    performing a Fourier transform calculation of size N delivering in an order reverse with respect to the natural order, N current auxiliary complex samples forming a current auxiliary symbol;
    performing subsequent processing of the current auxiliary symbol in which N current complex output samples are ordered according to the natural order, and forming a current output symbol based upon the current auxiliary samples delivered, the subsequent processing comprising
        sequentially storing N auxiliary samples in two separately addressable random access memories using a first addressing sequence corresponding to a first one of the natural and reverse orders, and
        sequential formulating N output samples and their sequential delivery in the natural order based upon a reading of the N stored auxiliary samples using a second addressing sequence corresponding to a second one of the natural and reverse orders.

7. A process according to claim 6, wherein each random access memory has a size at least equal to N/2.

8. A process according to claim 6, wherein the subsequent processing of the current auxiliary symbol is temporally nested with the respective subsequent processing of a preceding auxiliary symbol and of a next auxiliary symbol.

9. A process according to claim 6, wherein addressing of the two separately addressable random access memories is performed successively and alternately according to the first and the second addressing sequences.

10. A process according to claim 6, wherein during the sequentially storing comprises storing each of two paired auxiliary samples in a different memory; and wherein during the sequentially formulating comprises formulating simultaneously a current output sample of rank k and a paired current output sample of rank N−k.

11. A process according to claim 10, wherein the current output sample of rank k is delivered directly and the paired current output sample is stored in one of the memories while awaiting re-extraction prior to a subsequent delivery.

12. A process according to claim 6, wherein between the end of the delivery of the preceding auxiliary symbol and the end of the delivery of the current auxiliary symbol, the subsequent processing of the current auxiliary symbol and the subsequent processing of the preceding auxiliary symbol are performed beginning with the subsequent processing of the preceding auxiliary symbol and ending with the subsequent processing of the current auxiliary symbol.

13. A process according to claim 12, wherein between the end of the delivery of the current auxiliary symbol and the end of the delivery of the next auxiliary symbol, the subsequent processing of the next auxiliary symbol and the subsequent processing of the current auxiliary symbol are performed beginning with the subsequent processing of the current auxiliary symbol and ending with the subsequent processing of the next auxiliary symbol.

14. A device for transforming a stream of respective groups of 2N real input data into a stream of complex output symbols respectively formed of N complex output samples, by a processing of the interleaved type, the device comprising:
    an initial processor for processing a current input group comprising formulating a current initial symbol formed of N current initial complex samples ordered according to a natural order corresponding to reception of input data of the current input group, and for performing a Fourier transform calculation of size N delivering in an order said to be reverse with respect to the natural order, N current auxiliary complex samples forming a current auxiliary symbol;
    two random access memories of respective size at least equal to N/2;
    a subsequent processor for processing the current auxiliary symbol in which N current complex output samples are ordered according to the natural order, for forming a current output symbol based upon the current auxiliary samples delivered, for performing a sequential storage of N auxiliary samples in said two separately addressable random access memories using a first addressing sequence corresponding to a first one of the natural and reverse orders, and for performing a sequential formulation of N output samples and their sequential delivery in the natural order based upon a reading of the N stored auxiliary samples using a second addressing sequence corresponding to a second one of the natural and reverse orders.

15. A device according to claim 14, further comprising a controller for activating said subsequent processor so that the sequential storage and the sequential formulation are performed successively with regards to each current auxiliary symbol.

16. A device according to claim 14, further comprising a controller for activating said subsequent processor so that the sequential storage and the sequential formulation are performed in parallel with regards relating to two successive auxiliary symbols.

17. A device according to claim 14, further comprising a controller for activating said subsequent processor so that the sequential storage and the sequential formulation are alternately performed with each new activation of the sequential storage.

18. A modem comprising:

an input interface having an input for connection to a transmission medium and an output for providing a stream of respective groups of 2N real input data;

an initial processor connected to the output of said input interface and receiving the stream of respective groups of 2N real input data for processing a current input group comprising formulating a current initial symbol formed of N current initial complex samples ordered according to a natural order corresponding to reception of input data of the current input group, and for performing a Fourier transform calculation of size N delivering in an order reverse with respect to a natural order, N current auxiliary complex samples forming a current auxiliary symbol;

two random access memories;

a subsequent processor connected to said initial processor for processing the current auxiliary symbol in which N current complex output samples are ordered according to the natural order, and for forming a current output symbol based upon the current auxiliary samples delivered, for performing a sequential storage of N auxiliary samples in said two separately addressable random access memories using a first addressing sequence corresponding to a first one of the natural and reverse orders, and for performing a sequential formulation of N output samples and their sequential delivery in the natural order based upon a reading of the N stored auxiliary samples using a second addressing sequence corresponding to a second one of the natural and reverse orders;

whereby the stream of respective groups of 2N real input data is transformed into a stream of complex output symbols respectively formed of N complex output samples, by a processing of the interleaved type.

19. A modem according to claim 18, wherein each random access memory has a size at least equal to N/2.

20. A modem according to claim 18, further comprising a controller for activating said subsequent processor so that the sequential storage and the sequential formulation are performed successively with regards to each current auxiliary symbol.

21. A modem according to claim 18, further comprising a controller for activating said subsequent processor so that the sequential storage and the sequential formulation are performed in parallel with regards relating to two successive auxiliary symbols.

22. A modem according to claim 18, further comprising a controller for activating said subsequent processor so that the sequential storage and the sequential formulation are alternately performed with each new activation of the sequential storage.

23. A modem according to claim 18, wherein the stream of respective groups of 2N real input data provided at the output of said input interface is coded based upon orthogonal frequency division multiplex coding.

* * * * *

UNITED STATES PATENT AND TRADEMARK OFFICE
CERTIFICATE OF CORRECTION

PATENT NO. : 6,631,167 B1
DATED : October 7, 2003
INVENTOR(S) : Joël Cambonie et al.

It is certified that error appears in the above-identified patent and that said Letters Patent is hereby corrected as shown below:

Column 6,
Line 60, delete "$A_i^{K*} = A_i^K + A_{K/4+i}^K + A_{N/2+i}^K + A_{3N/4+i}^K$" insert
-- $A_i^{K*} = A_i^K + A_{N/4+i}^K + A_{N/2+i}^K + A_{3N/4+i}^K$ --

Column 10,
Line 58, delete "$B_{4K+2}, B_{4K+1}$ and $B_{4K+3}$" insert -- $B_i^{4K+2}, B_i^{4K+1}$ and $B_i^{4K+3}$ --
Lines 58-59, delete "(the blocks $BB_{4K}, BB^{4K+2}, BB^{4K+1}, BB_{4K+3}$" insert
-- (the blocks $BB^{4K}, BB^{4K+2}, BB^{4K+1}, BB^{4K+3}$). --

Signed and Sealed this

Thirtieth Day of March, 2004

JON W. DUDAS
*Acting Director of the United States Patent and Trademark Office*

UNITED STATES PATENT AND TRADEMARK OFFICE
CERTIFICATE OF CORRECTION

PATENT NO.    : 6,631,167 B1
DATED         : October 7, 2003
INVENTOR(S)   : Joël Cambonie et al.

It is certified that error appears in the above-identified patent and that said Letters Patent is hereby corrected as shown below:

<u>Title page,</u>
Item [73], Assignee, delete
"Assignee: STMicroelectronics S.A.,
            Gentilly (FR)" insert -- Assignee: STMicroelectronics S.A.,
             Gentilly (FR)
             France Telecom
             Paris, France --

Signed and Sealed this

Fourth Day of May, 2004

JON W. DUDAS
*Acting Director of the United States Patent and Trademark Office*